US009471847B2

(12) United States Patent
Zhu et al.

(10) Patent No.: US 9,471,847 B2
(45) Date of Patent: Oct. 18, 2016

(54) EFFICIENT DISTANCE METRIC LEARNING FOR FINE-GRAINED VISUAL CATEGORIZATION

(71) Applicant: NEC Laboratories America, Inc., Princeton, NJ (US)

(72) Inventors: Shenghuo Zhu, Santa Clara, CA (US); Yuanqing Lin, Sunnyvale, CA (US); Qi Qian, Princeton, NJ (US)

(73) Assignee: NEC Corporation (JP)

(*) Notice: Subject to any disclaimer, the term of this patent is extended or adjusted under 35 U.S.C. 154(b) by 35 days.

(21) Appl. No.: 14/524,441

(22) Filed: Oct. 27, 2014

(65) Prior Publication Data

US 2015/0117764 A1 Apr. 30, 2015

Related U.S. Application Data

(60) Provisional application No. 61/896,700, filed on Oct. 29, 2013, provisional application No. 62/030,678, filed on Jul. 30, 2014.

(51) Int. Cl.
*G06K 9/62* (2006.01)

(52) U.S. Cl.
CPC ........... *G06K 9/6201* (2013.01); *G06K 9/6232* (2013.01); *G06K 9/6251* (2013.01)

(58) Field of Classification Search
USPC ............... 382/155, 156, 159, 209, 218, 278; 345/617, 647
See application file for complete search history.

(56) References Cited

U.S. PATENT DOCUMENTS 6,622,135 B1 * 9/2003 Imbert De Tremiolles ........... G06K 9/6276 706/20
7,113,620 B2 * 9/2006 Shiotani ................ G06K 9/036 382/112
7,409,091 B2 * 8/2008 Sung .................. G06K 9/00248 382/159
7,466,848 B2 * 12/2008 Metaxas ................ A61B 5/055 382/128
7,574,016 B2 * 8/2009 Steinberg ........... H04N 5/23212 348/152
7,876,934 B2 * 1/2011 Georgescu ........... G06K 9/6255 128/922
8,126,219 B2 * 2/2012 Fukuda ............. G06K 9/00228 382/115
8,155,398 B2 * 4/2012 Togashi ............ G06K 9/00268 382/118
8,526,679 B2 * 9/2013 Saruta .................. G06K 9/4671 382/106
8,615,113 B2 * 12/2013 Lee .................... G06K 9/00275 382/100
2012/0143797 A1 6/2012 Wang et al.

OTHER PUBLICATIONS

Angelova, A. et al., "Efficient Object Detection and Segmentation for Fine-Grained Recognition," Jun. 2013. pp. 811-818.
Chechik, G. et al., "Large Scale Online Learning of Image Similarity Through Ranking," Journal of Machine Learning Research. Mar. 2010. pp. 1109-1135. vol. 11.
Davis, J., et al., "Structured Metric Learning for High Dimensional Problems," Aug. 2008. pp. 195-203.

(Continued)

*Primary Examiner* — Yosef Kassa
(74) *Attorney, Agent, or Firm* — Joseph Kolodka

(57) ABSTRACT

Methods and systems for distance metric learning include generating two random projection matrices of a dataset from a d-dimensional space into an m-dimensional sub-space, where m is smaller than d. An optimization problem is solved in the m-dimensional subspace to learn a distance metric based on the random projection matrices. The distance metric is recovered in the d-dimensional space.

12 Claims, 2 Drawing Sheets

Generate two random matrices, R1 and R2
102

Randomly sample one epoch triplets
104

Run SGD in subspace by random projection
106

Compute dual variables
108

Recover metric in original space
110

Randomly select one epoch active constraints by updated metric
112

Criteria met?
114

Yes

END

No

(56) References Cited

OTHER PUBLICATIONS

Halko, N., et al., "Finding Structure With Randomness: Probabilistic Algorithms for Constructing Approximate Matrix Decompositions," May 2011. Vol. 53, No. 2. pp. 1-74.
Weinberger, K., et al.,"Distance Metric Learning for Large Margin Nearest Neighbor Classification," Journal of Machine Learning Research. Feb. 2009, Vol. 10. pp. 207-244.
Zhang, L., et al., "Recovering the Optimal Solution by Dual Random Projection," JMLR: Workshop and Conference Proceedings. Jun. 2013. Vol. 30. pp. 1-23.
Lijun Zhang et al., "Recovering Optimal Solution by Dual Random Projection," In: JMLR: Workshop and Conference Proceedings, vol. 30, pp. 135-157, Jun. 13, 2013 (http://jmlr.csail.mit.edu/proceedings/papers/v30/Zhang13a.pdf) See p. 136, lines 6-27; p. 137, lines 10-16; p. 138, lines 30-32; p. 139, lines 24-25; and p. 140, lines 1-2 and 19-21.

* cited by examiner

EFFICIENT DISTANCE METRIC LEARNING FOR FINE-GRAINED VISUAL CATEGORIZATION

RELATED APPLICATION INFORMATION

This application claims priority to provisional application No. 61/896,700 filed Oct. 29, 2013, and to provisional application No. 62/030,678 filed Jul. 30, 2014. The contents thereof are incorporated herein by reference.

BACKGROUND OF THE INVENTION

Fine-grained visual categorization (FGVC) is a recent proposed in computer vision research. Compared with traditional image classification, FGVC assumes that classes are very similar to each other, where even human vision cannot always classify them correctly at the first glance. This problem arises in many real-world classification applications, especially for species recognition between, e.g., cats and dogs, birds, aircraft, flowers, etc.

Most existing approaches for FGVC rely on extracting specific features rather than traditional image features from given fine-grained classes with domain knowledge. All of these methods achieve good performance in their domains with one-v s-all linear support vector machines (SVMs) as the final classifier. Feature learning has attracted so much attention, in fact, that few have attempted to develop FGVC methodologies rather than directly applying linear SVMs.

Although linear SVM is efficient for high-dimensional classification tasks, it is not as effective as kernel SVM and cannot guarantee that it explores information sufficiently from well-extracted features. Furthermore, both of linear SVM and kernel SVM fail to realize the property that most fine-grained datasets could be of low rank, which means low-dimensional representations are sufficient for the data sets. That is important for economical storage and image retrieval, where the lower the dimension, the better for searching neighbors.

BRIEF SUMMARY OF THE INVENTION

A method for distance metric learning includes generating two random projection matrices of a dataset from a d-dimensional space into an m-dimensional sub-space, where m is smaller than d. An optimization problem is solved in the m-dimensional subspace to learn a distance metric based on the random projection matrices. The distance metric is recovered in the d-dimensional space.

A system for distance metric learning includes a projection module configured to generate two random projection matrices of a dataset from a d-dimensional space into an m-dimensional sub-space, where m is smaller than d. A processor is configured to solve an optimization problem in the m-dimensional subspace to learn a distance metric based on the random projection matrices. A metric recovery module is configured to recover the distance metric in the d-dimensional space.

DETAILED DESCRIPTION

Embodiments of the present principles provide distance metric learning for high-dimensional fine-grained image classification. To handle issues relating to high dimensionality, dual random projection is used to project the dataset onto a low-dimensional subspace where the problem may be efficiently solved using stochastic gradient descent (SGD). Unlike random projection, which reports the metric in the low-dimensional subspace, dual variables are estimated by a learned distance metric and the final metric is reconstructed by them in the original space.

Distance metric learning (DML), which learns a Mahalanobis distance metric to force images with the same label closer and those with different labels farther, is used in the present embodiments. Similarity in a new space that is spanned by a learned metric will be much better than that from a Euclidean distance in the original space. This produces better classification performance and keeps the rank of the learned metric low when rank presentation is sufficient for datasets. The present embodiments use random projection twice for DML to make the projection unbiased. The metric is learned in the random projected space by a stochastic metric learning method. After estimating dual variables by the learned metric, the present embodiments recover the low-rank metric in the original space. This process is iterative and a number of triplet constraints is proportional to the number of data samples at each iteration. This makes the learning process more efficient.

Figure 1:
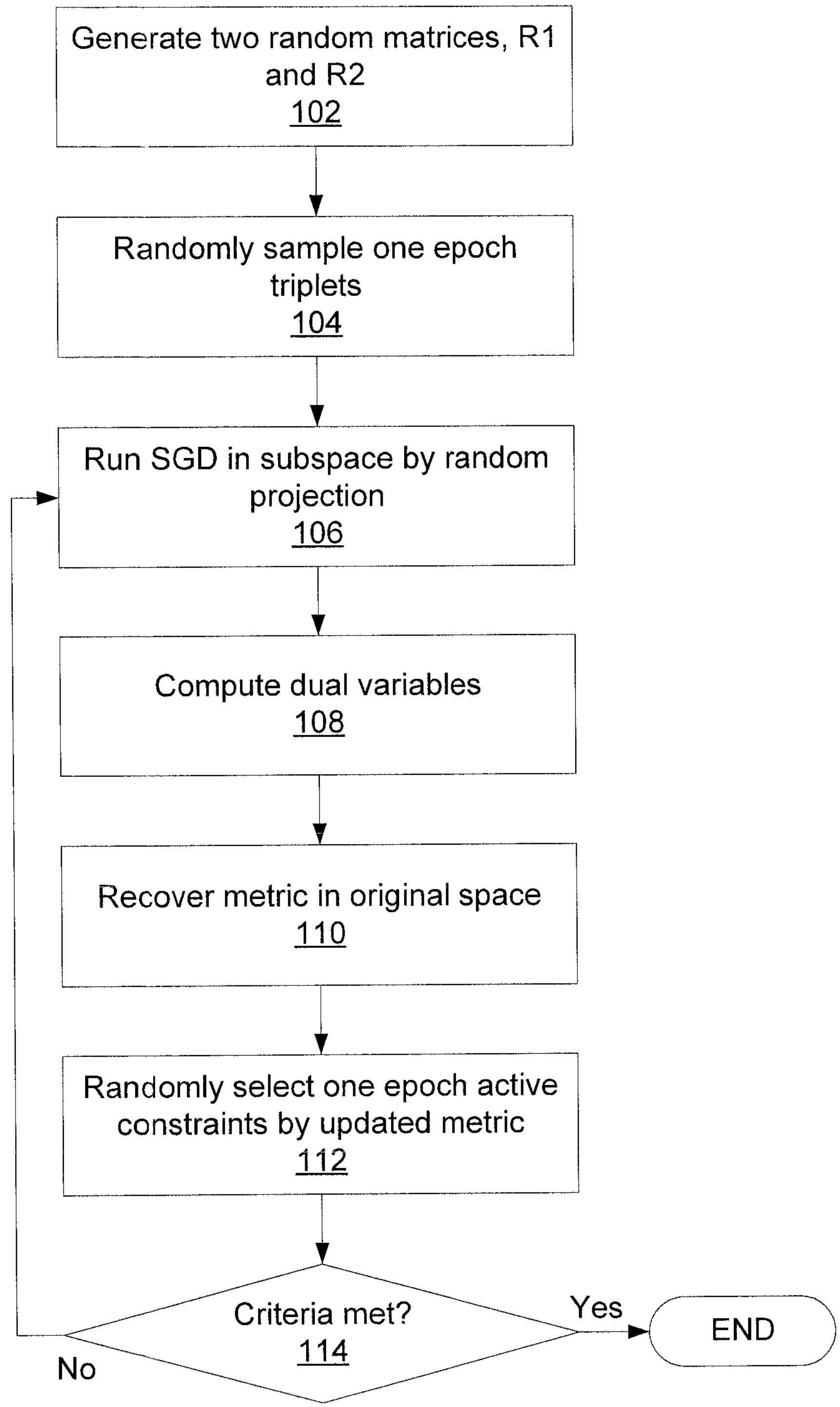
FIG. 1 is a block/flow diagram of a method for learning a distance metric in accordance with the present principles.

Referring now to FIG. 1, a method for high-dimensional metric learning is shown. Block 102 generates two random matrices, R1 and R2, to represent two random projections and to keep the model unbiased. This stands in contrast to conventional methods which use only one random projection and thus cannot preserve unbiasedness in metric learning. Block 104 randomly samples triplets for one epoch. The number of constraints is proportional to the number n of data samples. Again, this contrasts to conventional approaches, where $n^3$ constraints are used for optimization.

Block 106 performs SGD to learn a random projected metric using the two random projections. Block 108 computes dual variables by the learned distance metric and block 110 then recovers the learned metric in the original space. Recovery of the metric in block 110 includes using a randomized approach to obtain a low-rank approximation according to the formula of recovering. This avoids storing the entire metric in the original space.

Block 112 randomly selects one epoch's active constraints in each iteration. Block 114 determines whether the process has converged according to stop criteria. If so, processing ends. If not, processing returns to block 106 for a further iteration. The stopping criteria may be when the number of active constraints is less than half a number of training examples.

Given an image dataset $X=\{x_1, \ldots, x_n\}\in\mathbb{R}^{d\times n}$, the squared Mahalanobis distance between two images $x_i$ and $x_j$ is defined as $dis(x_i,x_j)=(x_i-x_j)^T M(x_i-x_j)$, where $M\in\mathbb{R}^{d\times d}$ is the distance metric. In one example, the distance metric M is the Euclidean distance when M is an identity matrix. Distance metric learning tries to learn a good distance metric M such that, for any triplet $(x_i,x_j,x_k)$, where $x_i$ and $x_j$ share the same label and $x_k$ has a different label, $(x_i-x_j)^T M(x_i-x_j)+1\leq(x_i-x_k)^T M(x_i-x_k)$. The target of distance metric learning can be written as an optimization problem:

$$\min_{M\in S_d} \frac{\lambda}{2}\|M\|_F^2 + \frac{1}{N}\sum_{t=1}^{N} l(\langle A_t, M\rangle)$$

where $S_d$ denotes the d×d real symmetric matrix, $A_t=(x_i^t-x_k^t)(x_i^t-x_k^t)^T-(x_i^t-x_j^t)(x_i^t-x_j^t)^T$, $\|\cdot\|_F^2$ is the Frobenius norm, N is the number of total triplets $A_t$ is the representation of the $t^{th}$ triplet, and $\langle\cdot,\cdot\rangle$ is the dot product between two matrices. The learned matrix from $S_d$ is projected onto a positive semidefinite (PSD) cone at the end of the optimization. l(.) is any smoothed convex loss function.

Solving this optimization problem is difficult as the size of the matrix is extremely large. Even if it can be stored in memory, solving by a gradient-based method costs $O(d^2)$ computations at every step.

Using dual random projection estimates dual variables in a low-dimensional space spanned by random projection and then recovers the solution in the original space using the dual variables. Given the two random matrices R1 and R2 from block 102, $A_t$ is projected to a low-dimensional space as $\hat{A}_t=R_1^TA_tR_2$. The dual problem then becomes:

$$\max_{\alpha\in[-1,0]^N} -\sum_{t=1}^{N} l_*(\alpha_t)-\frac{1}{2\lambda N}\alpha^T\hat{G}\alpha$$

where $\hat{G}(a,b)=\langle R_1^TA_aR_2,R_1^TA_bR_2\rangle$, λ is the weight of the regularizer $\|M\|_F^2$, α is a vector of all the dual variables, $\alpha_t$ is the $i^{th}$ element in α and is also the dual variable for the $t^{th}$ triplet, $\hat{G}$ is a matrix, and $l_*(\alpha_t)$ is the complex conjugate of the smoothed convex loss function.

Solving this dual problem means maintaining all of the dual variables during optimization. However, the number of dual variables corresponds to the number of triplets, which is $O(n^3)$. To avoid optimizing such a large number of dual variables, the primal problem is solved with a random projection:

$$\min_{\hat{M}\in S_m}\frac{\lambda}{2}\|\hat{M}\|_F^2+\frac{1}{N}\sum_{t=1}^{N} l(\langle\hat{A}_t,\hat{M}\rangle)$$

which in this case uses a low-dimensional metric $\hat{M}$ and only leads to optimizing $O(m^2)$ variables. After obtaining the solution, the dual variables are estimated and the solution is recovered in the original space using the dual variables.

For large data sets, even SGD is time consuming, since the number of triplets will remain $O(n^3)$. On the other hand, only active constraints could have impact for the gradient of the loss function. Therefore an iterative approach is used to boost the process. At each iteration, the PSD metric is reconstructed in the original space and the active constraints are sampled according to it. The problem is then solved again with the new constraints in the low-dimensional subspace. The optimization problem at the $s^{th}$ iteration then becomes:

$$\min_{\hat{M}\in S_m}\frac{\lambda}{2}\|\hat{M}_s-\hat{M}_{s-1}\|_F^2+\frac{1}{n}\sum_{t=1}^{n} l(\langle\hat{A}_t,\hat{M}\rangle)$$

where $\hat{M}_{s-1}\in S_m$ is the solution from the previous iteration in the low-dimensional space. This problem is solved by SGD and the average result is returned. The optimization problem at the $s^{th}$ iteration is equivalent to $$\min_{\hat{M}\in S_m}\frac{\lambda}{2}\left\|\hat{M}_s-\frac{\gamma}{\sqrt{n}}\right\|_F^2+\frac{1}{ns}\sum_{t=1}^{ns} l(\langle\hat{A}_t,\hat{M}\rangle)$$

where γ is a constant and $\sqrt{N}$ is usually larger than γ, such that bias can be ignored.

Recovery of the high-dimensional matrix M can be found as $$M=-\frac{1}{\lambda N}XCX^T$$

where C is a sparse matrix for each triplet $(x_i,x_j,x_k)$ where $C(i,j)=-\alpha$, $C(j,i)=-\alpha$, $C(j,j)=\alpha$, $C(i,k)=\alpha$, $C(k,i)=-\alpha$, and $C(k,k)=-\alpha$. The d×d matrix M is represented by the d×n matrix X and the n×n matrix C. Although n could be larger than d for large-scale problems, it is convenient to store the dataset in a distributed fashion and efficiently operate in parallel. The number of elements in the sparse matrix C is n×s, where s is the number of iterations and is usually less than 60. A power method is applied to perform eigen-decomposition for the M based on the representation above.

Figure 2:
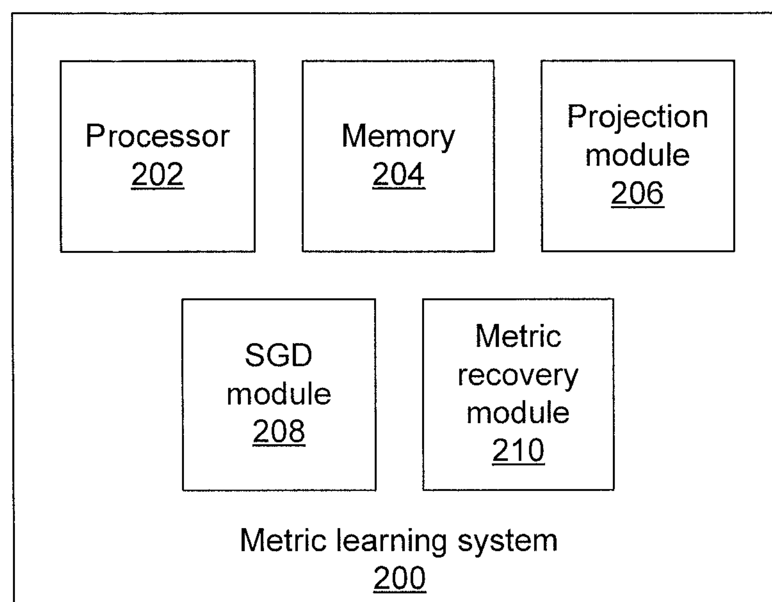
FIG. 2 is a block diagram of a system for learning a distance metric in accordance with the present principles.

Referring now to FIG. 2, a system 200 for high-dimensional metric learning is shown. A hardware processor 202 is used to learn a metric for, e.g., fine-grained visual classification across a high-dimensional classification space. A memory 204 stores a dataset that characterizes images to be compared across many dimensions and the processor 202 finds a distance between two given images. To accomplish this, a metric is learned by projecting the dataset into a lower-dimensional space using projection module 206. SGD module 208 uses the processor 202 to determine a metric solution in the lower-dimensional space. The metric is then recovered in the high-dimensional space using metric recovery module 210.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in Appendix A to the application. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method for distance metric learning, comprising:

generating two random projection matrices of a dataset from a d-dimensional space into an m-dimensional sub-space, where m is smaller than d;

solving an optimization problem in the m-dimensional subspace to learn a distance metric based on the random projection matrices;

recovering the distance metric in the d-dimensional space by obtaining a low-rank approximation using a randomized approach to avoid storing the entire metric in the original space; and classifying images using the recovered distance metric.

2. The method of claim 1, wherein said steps of generating, solving, and recovering are performed iteratively.

3. The method of claim 2, wherein triplets of only one epoch are selected in each iteration.

4. The method of claim 1, wherein solving the optimization problem comprises performing stochastic gradient descent in the m-dimensional subspace.

5. The method of claim 1, wherein solving the optimization problem comprises computing dual variables in the m-dimensional subspace.

6. The method of claim 1, wherein the optimization problem is:

$$\min_{\hat{M}\in S_m} \frac{\lambda}{2}\|\hat{M}\|_F^2 + \frac{1}{N}\sum_{t=1}^{N} l(\langle \hat{A}_t, \hat{M}\rangle)$$

where $S_m$ is the m-dimensional subspace, $\hat{M}$ is a metric in the m-dimensional subspace, $\|\cdot\|_F^2$ is the Frobenius norm, $\lambda$ is a weight for regularizer $\|\hat{M}\|_F^2$, l(.) is any smoothed convex loss function, $\langle\cdot,\cdot\rangle$ is the dot product between two matrices, N is a number of triplets, and $\hat{A}_t$ is a $t^{th}$ dual variable.

7. A system for distance metric learning, comprising:

a projection module configured to generate two random projection matrices of a dataset from a d-dimensional space into an m-dimensional sub-space, where m is smaller than d;

a processor configured to solve an optimization problem in the m-dimensional subspace to learn a distance metric based on the random projection matrices; and a metric recovery module configured to recover the distance metric in the d-dimensional space by obtaining a low-rank approximation using a randomized approach to avoid storing the entire metric in the original space, wherein the processor is further configured to classify images using the recovered distance metric.

8. The system of claim 7, wherein the projection module, processor, and metric recovery module are configured to operate iteratively.

9. The system of claim 8, wherein triplets of only one epoch are selected in each iteration.

10. The system of claim 7, wherein the processor is configured to solve the optimization problem using a stochastic gradient descent in the m-dimensional subspace.

11. The system of claim 7, wherein the processor is configured to solve the optimization problem by computing dual variables in the m-dimensional subspace.

12. The system of claim 7, wherein the optimization problem is:

$$\min_{\hat{M}\in S_m} \frac{\lambda}{2}\|\hat{M}\|_F^2 + \frac{1}{N}\sum_{t=1}^{N} l(\langle \hat{A}_t, \hat{M}\rangle)$$

where $S_m$ is the m-dimensional subspace, $\hat{M}$ is a metric in the m-dimensional subspace, $\|\cdot\|_F^2$ is the Frobenius norm, $\lambda$ is a weight for regularizer $\|\hat{M}\|_F^2$, l(.) is any smoothed convex loss function, $\langle\cdot,\cdot\rangle$ is the dot product between two matrices, N is a number of triplets, and $\hat{A}_t$ is a $t^{th}$ dual variable.

* * * * *